United States Patent
Ginart et al.

(10) Patent No.: US 11,271,402 B2
(45) Date of Patent: Mar. 8, 2022

(54) DETECTION AND ELIMINATION OF DC INJECTION ON THE POWER GRID SYSTEM

(71) Applicant: Smart Wires Inc., Union City, CA (US)

(72) Inventors: Antonio Ginart, Santa Clarita, CA (US); Shreesha Adiga Manoor, Milpitas, CA (US); Mahsa Ghapandar Kashani, Millbrae, CA (US); Hamed Khalilinia, Hayward, CA (US); Haroon Inam, San Jose, CA (US); Amrit Iyer, Oakland, CA (US); Govind Chavan, Fremont, CA (US); Niloofar Torabi, Menlo Park, CA (US)

(73) Assignee: Smart Wires Inc., Union City, CA (US)

(*) Notice: Subject to any disclaimer, the term of this patent is extended or adjusted under 35 U.S.C. 154(b) by 7 days.

(21) Appl. No.: 16/814,647

(22) Filed: Mar. 10, 2020

(65) Prior Publication Data
US 2020/0328594 A1    Oct. 15, 2020

Related U.S. Application Data

(60) Provisional application No. 62/831,595, filed on Apr. 9, 2019.

(51) Int. Cl.
*H02J 3/26* (2006.01)
*H02J 3/01* (2006.01)
(Continued)

(52) U.S. Cl.
CPC    *H02J 3/26* (2013.01); *H02J 3/01* (2013.01); *H02J 3/38* (2013.01); *H02J 13/00009* (2020.01); *H02M 7/4803* (2021.05); *H02M 7/49* (2013.01)

(58) Field of Classification Search
CPC . H02J 3/01; H02J 3/26; H02M 7/4803; G05F 1/66; G05F 1/70
See application file for complete search history.

(56) References Cited

U.S. PATENT DOCUMENTS

| | | |
|---|---|---|
| 3,571,494 A | 3/1971 | Law |
| 4,013,859 A | 3/1977 | Peters, Jr. |

(Continued)

FOREIGN PATENT DOCUMENTS

| | | |
|---|---|---|
| CN | 103399200 B | 12/2015 |
| WO | 2004/013951 A2 | 2/2004 |

(Continued)

OTHER PUBLICATIONS

Extended European Search Report dated Jun. 2, 2020; European Patent Application No. 20168791.0; 9 pages total.

(Continued)

*Primary Examiner* — Fred E Finch, III
(74) *Attorney, Agent, or Firm* — Womble Bond Dickinson (US) LLP

(57) ABSTRACT

The presence of injected DC has harmful consequences for a power grid system. A piecewise sinusoidal ripple voltage wave at the line-frequency that rides on the main capacitor bank of the power converter is observed. This observation leads to a new DC detection elimination method. Three DC elimination methods for this ripple component are disclosed to allow dissipation of DC energy through heat and/or electromagnetic wave, or to allow transformation of this energy into usable power that is fed back into the power grid.

20 Claims, 13 Drawing Sheets

Transformation of the DC injection component into usable energy

(51) Int. Cl.
*H02J 3/38* (2006.01)
*H02J 13/00* (2006.01)
*H02M 7/49* (2007.01)
*H02M 7/48* (2007.01)

(56) References Cited

U.S. PATENT DOCUMENTS

| | | | |
|---|---|---|---|
| 4,068,159 A | 1/1978 | Gyugyi | |
| 5,179,489 A | 1/1993 | Oliver | |
| 6,282,104 B1* | 8/2001 | Kern | H02M 1/12 363/34 |
| 7,117,070 B2 | 10/2006 | Chow et al. | |
| 7,615,989 B2 | 11/2009 | Kojori | |
| 7,787,267 B2 | 8/2010 | Wu et al. | |
| 8,964,427 B2 | 2/2015 | Kerkman et al. | |
| 9,396,866 B2 | 7/2016 | Ramirez | |
| 9,450,410 B2 | 9/2016 | Moore et al. | |
| 9,753,059 B2 | 9/2017 | Kreikebaum et al. | |
| 9,906,031 B2 | 2/2018 | Ramsay et al. | |
| 10,075,016 B2 | 9/2018 | Wilkins et al. | |
| 2004/0196675 A1* | 10/2004 | Cope | H02M 1/14 363/39 |
| 2007/0007969 A1* | 1/2007 | Dai | H02M 7/48 324/601 |
| 2013/0033907 A1 | 2/2013 | Zhou et al. | |
| 2013/0058144 A1* | 3/2013 | Hiramatsu | H02M 1/12 363/131 |
| 2017/0235286 A1 | 8/2017 | Inam et al. | |
| 2018/0054140 A1* | 2/2018 | Chen | H02M 7/797 |
| 2018/0145504 A1 | 5/2018 | Kovan et al. | |

FOREIGN PATENT DOCUMENTS

| | | |
|---|---|---|
| WO | 2004/013951 A3 | 10/2004 |
| WO | 2015/139743 A1 | 9/2015 |

OTHER PUBLICATIONS

Buticchi, Giampaolo, et al., "Active Filter for the Removal of the DC Current Component for Single-Phase Power Lines", IEEE Transactions on Industrial Electronics, Oct. 2013, vol. 60, No. 10, Oct. 2013, Abstract 2 pages total.

Lem USA, Inc., "Current Transducer LF 1010-S/SPA5", Mar. 20, 2018, 7 pages total.

Molinski, Tom S., "Shielding grids from solar storms", IEEE Spectrum, Nov. 2000, pp. 56-60.

Tamura Corporation of America, "Closed loop Hall Effect Sensors", Oct. 2018, 16 pages total.

Office Action dated Nov. 19, 2021; U.S. Appl. No. 16/814,623; 28 pp. total.

* cited by examiner

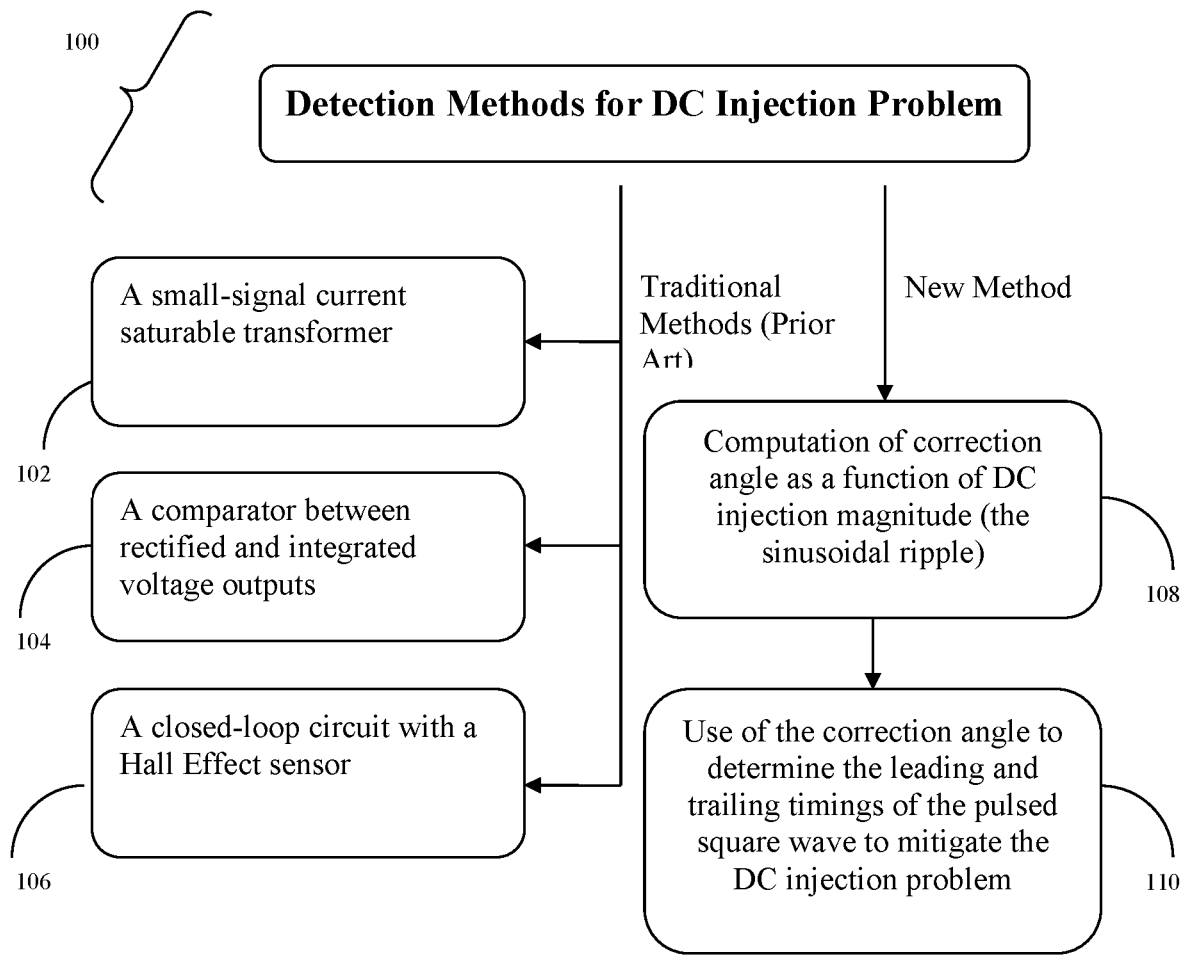
Figure 1. Detection Methods for DC Injection Problem

- Fourier decomposition
- $I(t) = I_{DC} + I_L \cos(\omega t + \delta)$
- To compute the Voltage in the capacitor by superposition
- $V_C(t) = 1/C \int I(t)\, dt$
- $Vc_{DC}(t) = \int I_{DC}\, dt$
- $Vc_{AC}(t) = \int I_L \cos(\omega t + \delta)\, dt$
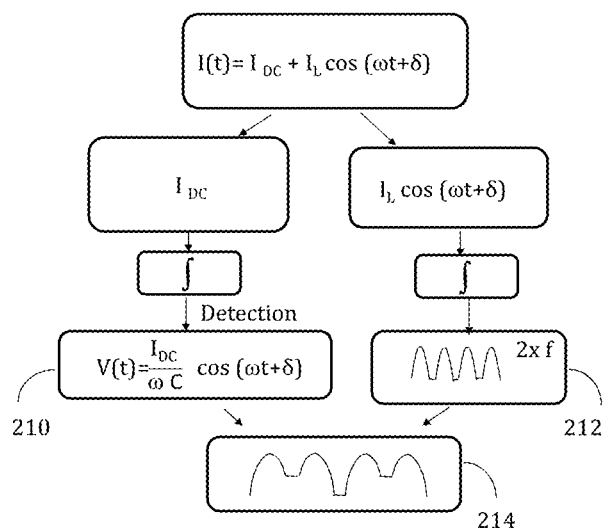
Figure 2. Fourier transformation decomposition model for the DC injection component

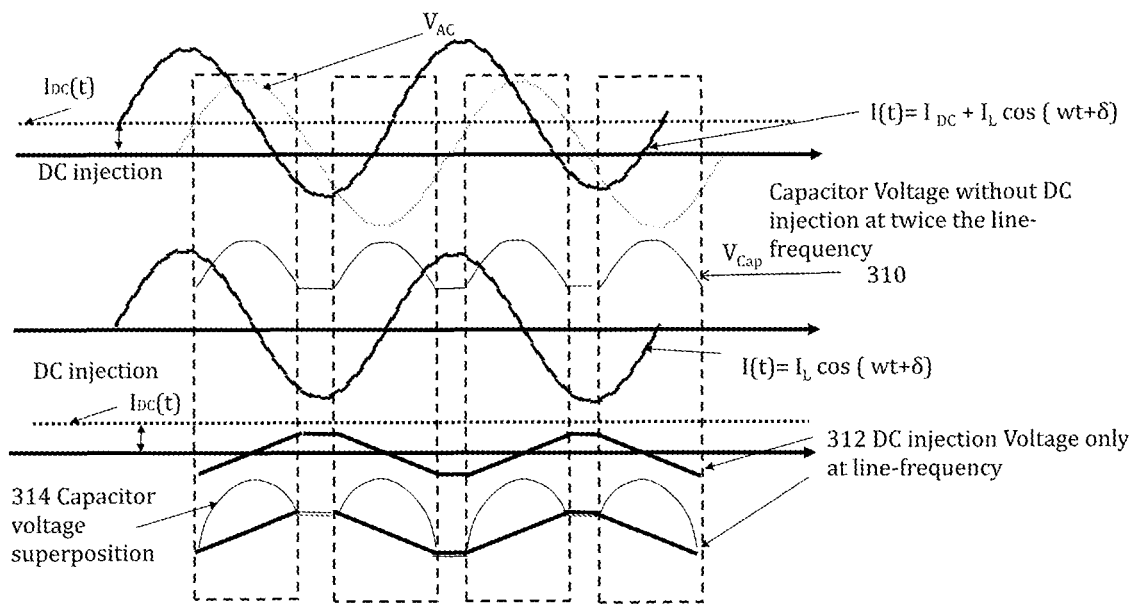
Figure 3. Superposition of the DC injection component on the capacitor voltage

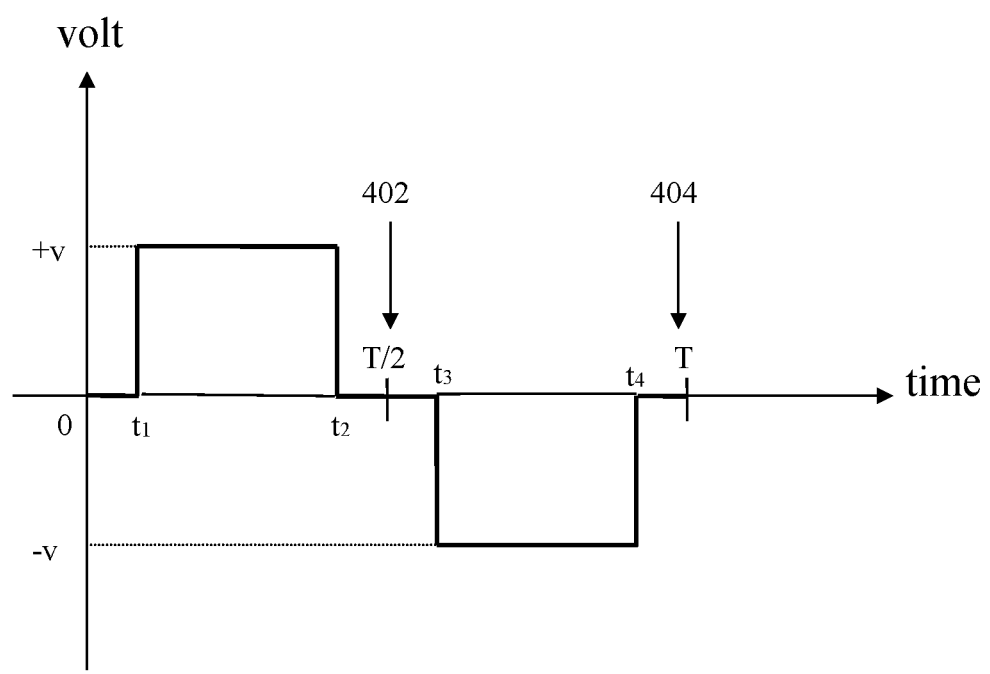
Figure 4. The four timings of a generated pulsed square wave

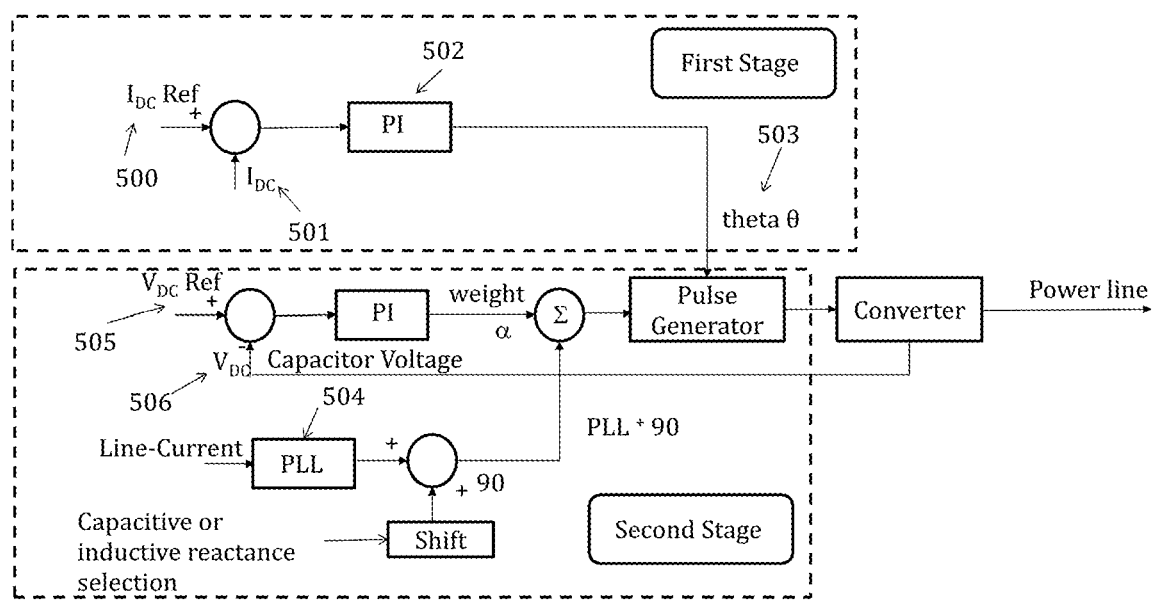
Figure 5A. Correction angle computation and pulsed square wave generation

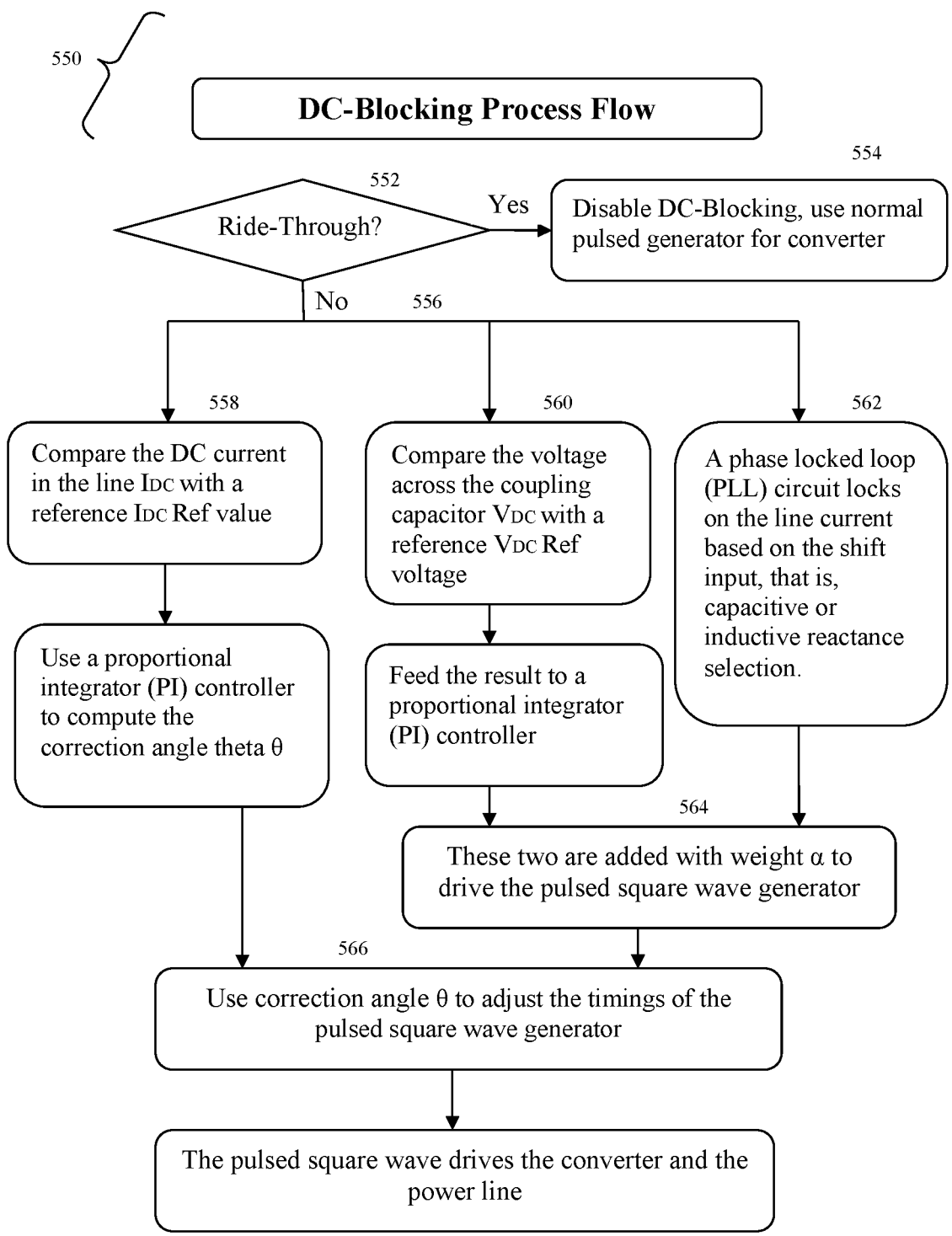
Figure 5B. DC-Blocking Process Flow Diagram

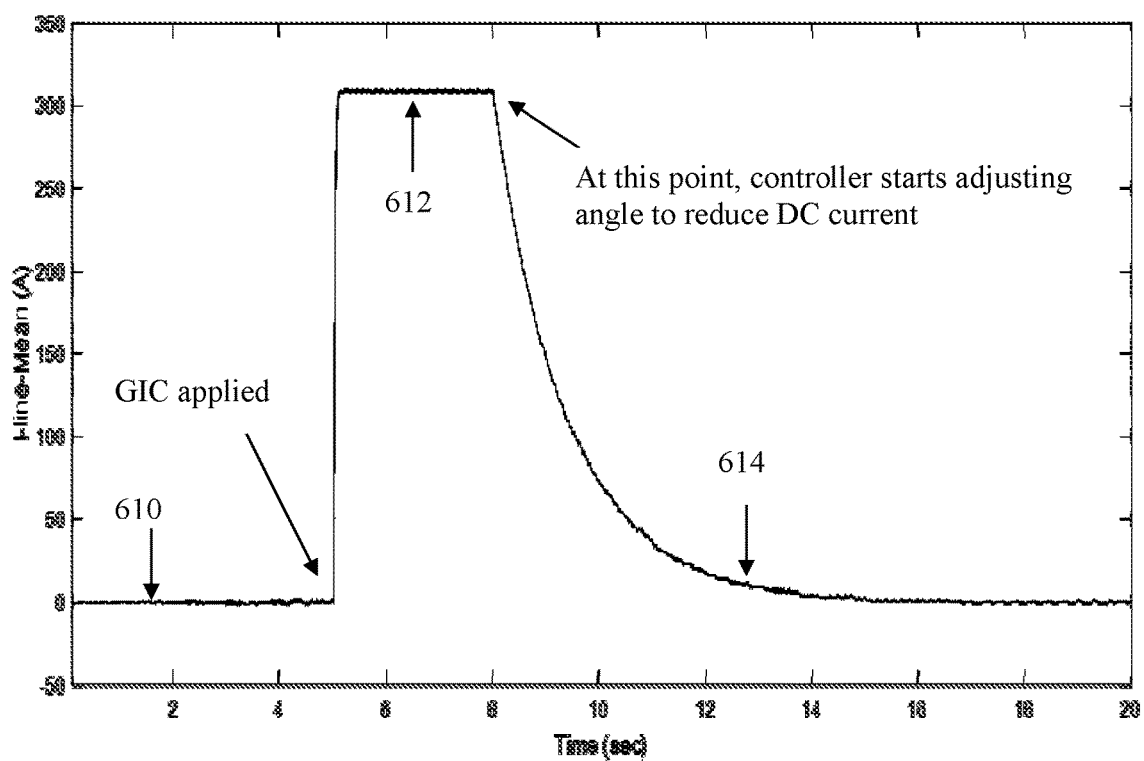
Figure 6. Line current before DC injection, during DC injection and after mitigation control is applied

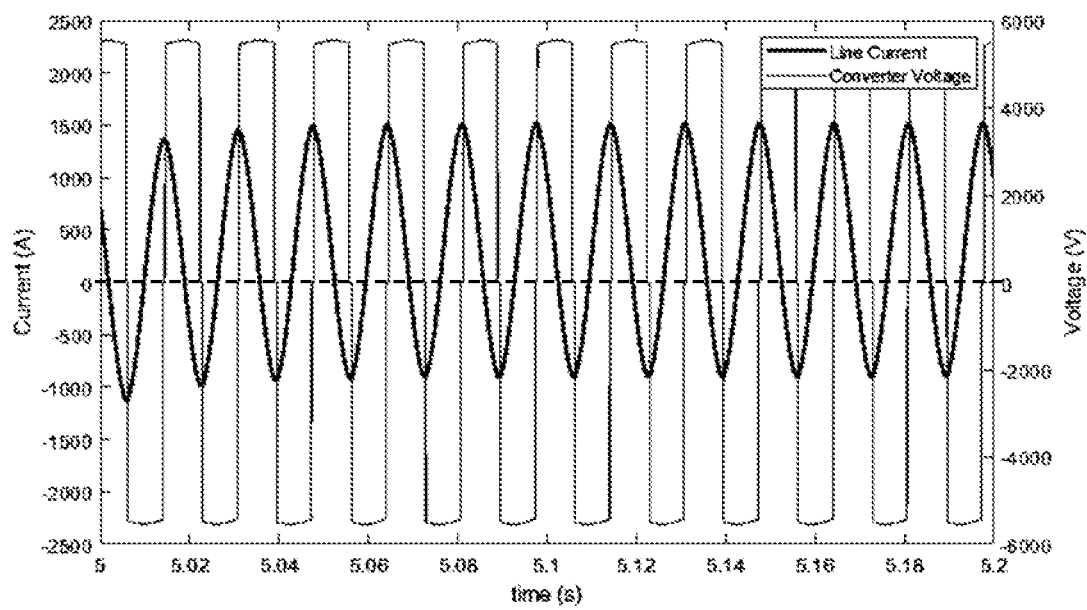
Figure 7A. Pulsed square wave voltage output and line current output before DC injection mitigation

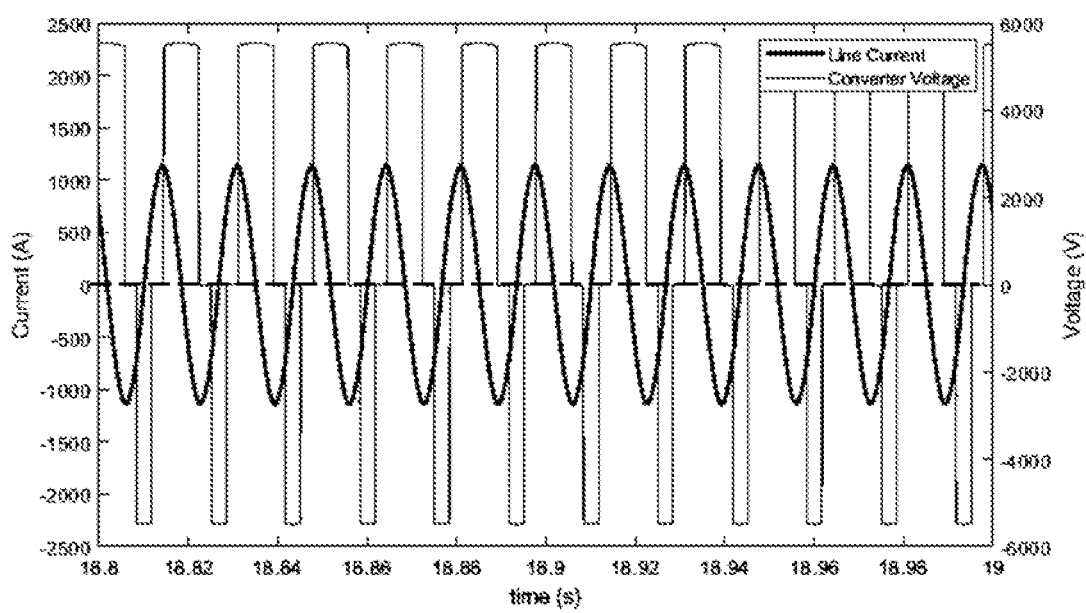
Figure 7B. Pulsed square wave voltage output and line current output after DC injection mitigation

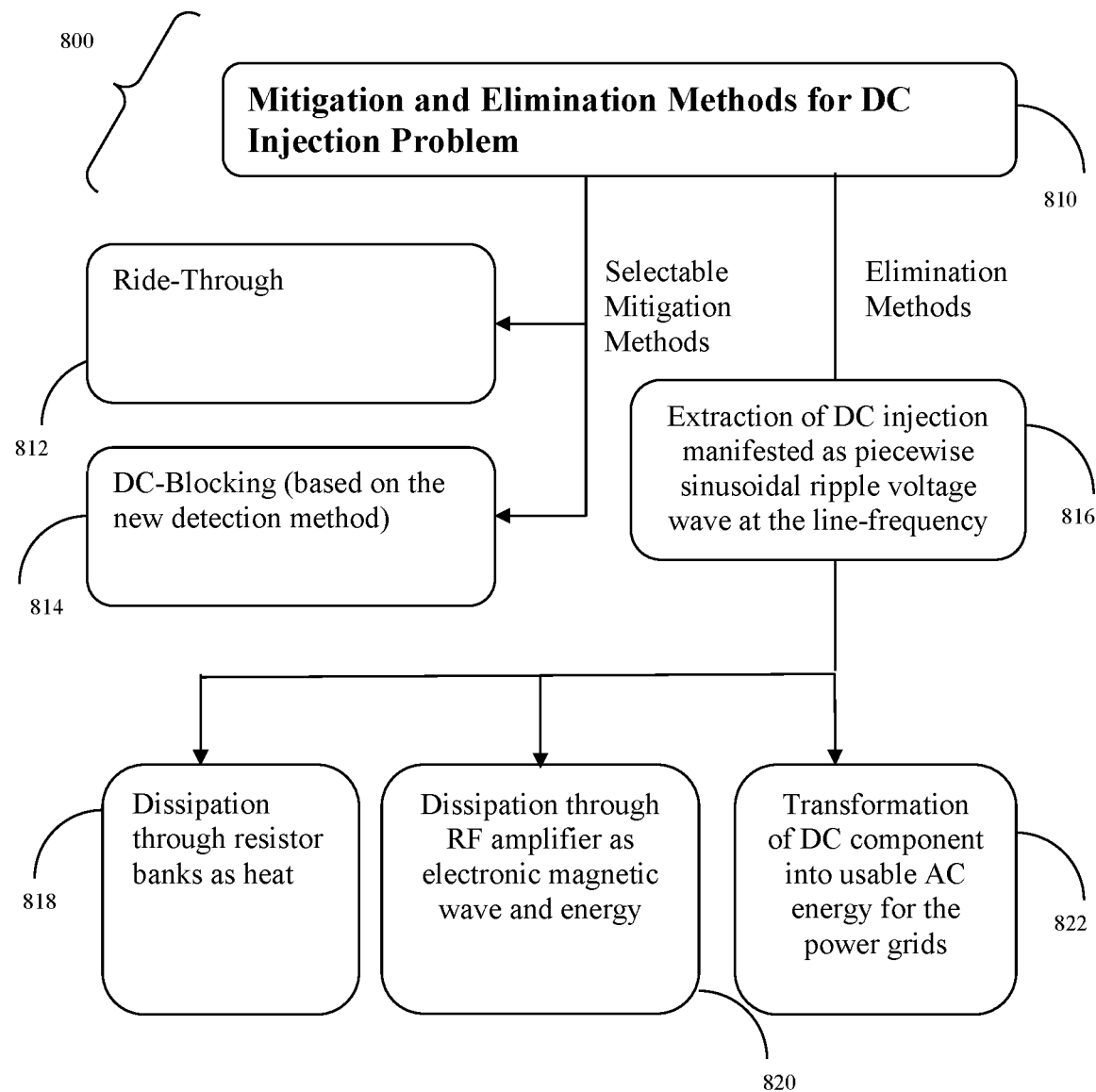
Figure 8. Mitigation and Elimination Methods for DC Injection Problem

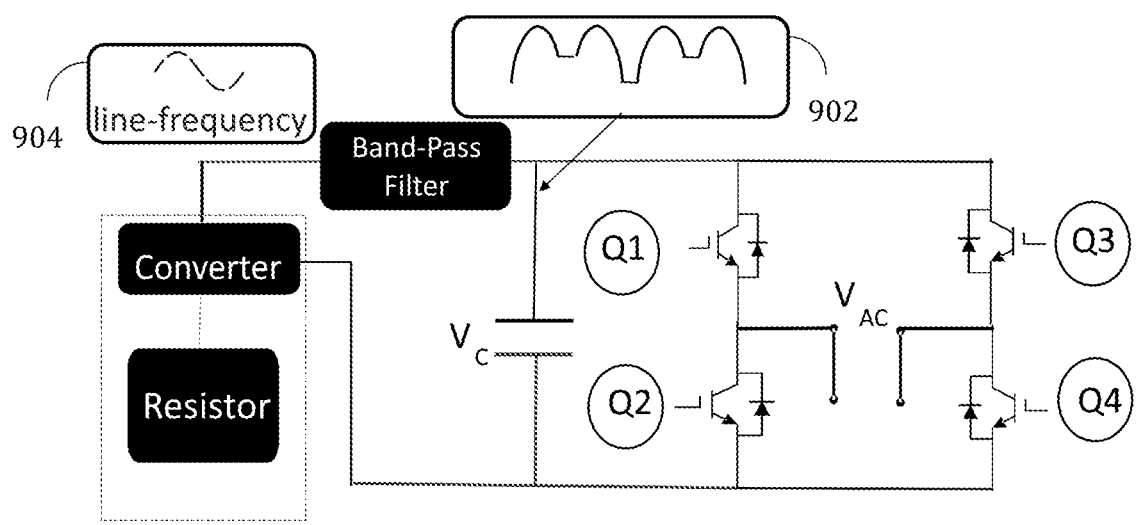
Figure 9. Extraction of the DC component and dissipated through a resistor as heat

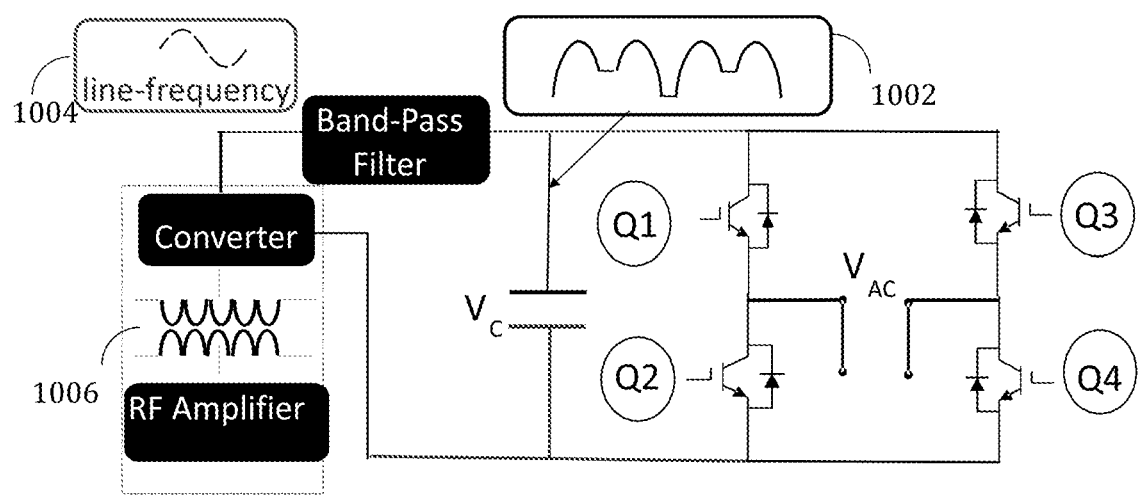
Figure 10. Extraction of DC component and dissipated through a RF Amplifier as EM Wave

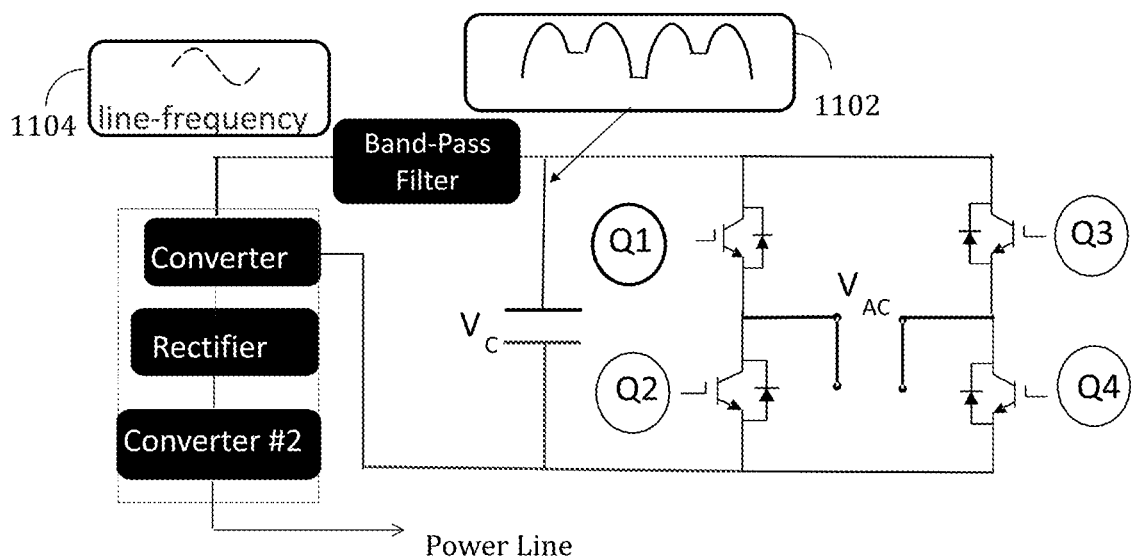
Figure 11. Transformation of the DC injection component into usable energy

DETECTION AND ELIMINATION OF DC INJECTION ON THE POWER GRID SYSTEM

CROSS REFERENCE TO RELATED APPLICATIONS

This application claims the benefit of U.S. Provisional Application No. 62/831,595 filed on Apr. 9, 2019, the disclosure of which is incorporated herein by reference.

TECHNICAL FIELD

Embodiments of the present disclosure relate generally to power distribution systems. More particularly, embodiments of the disclosure relate to systems and methods of detection, mitigation and elimination of DC components present in a power distribution system.

BACKGROUND

Three-phase alternating current (AC) is a common form of electric power generation, transmission, and distribution. It is the most common method used by electrical grids worldwide to transfer power. The efficiency of the power grid depends heavily on the balance of the three phases and is very susceptible to injected direct current (DC).

Modern-day distributed generation introduces multi-generator grids and new modes of operation. These new modes of operation will likely introduce power electronic (PE) converters, such as impedance injection modules, on a large scale at the low- and medium-voltage levels. DC injection into the AC grid is a threat from grid-connected PE converters that are not structured to handle this issue.

The invention described herein builds on the core architecture, especially the series power reactor/converter, disclosed in U.S. Pat. No. 9,906,031 "Power line reactance module and applications." This document focuses only on those functionalities that are new and additional to the core architecture therein.

Some DC injection problems from external sources require special consideration, including the geomagnetically induced currents (GICs). It has been well known for more than 60 years that electric utilities in northern latitudes can have GICs flowing in their transmission lines and transformer ground points and that these GICs are caused by geomagnetic storms often associated with solar flares. It was realized only in the last 50 years that large GICs can become problematic in the power system and even severe enough to cause a complete system shutdown. Utilities susceptible to GIC cannot rely on luck that a geomagnetic storm will not affect them, or if it does, that the loading conditions at the time will allow enough margins to ride through it.

The DC injection problem becomes more prevalent as multilevel converters, sometimes known as impedance injection modules, are introduced to manage the efficiency of transmission line power flow in recent decades. This transformer-less flexible alternating current transmission system (TL-FACTS) provides a unique capability to adjust the power impedance to minimize power loss in the power delivery process. New problems, including DC injection, are introduced as it is connected in series with the power line without the benefit of a transformer's galvanic isolation.

A DC component can cause the magnetic core saturation of distribution power transformers. Transformers operating under saturation conditions present increased power losses, overheating, and distorted current waveforms. Accordingly, the invention described herein presents a new detection and control method to mitigate the harmful effects of DC injection in general and GIC in particular. Three elimination methods for energy comprising the injected DC are also presented to provide relief to the utilities.

SUMMARY

Disclosed herein is an apparatus used to eliminate a DC component on a power line carrying AC. The apparatus includes a voltage converter circuit and a DC elimination circuit. The voltage converter circuit is configured to extract the DC component of the power line from power line. The DC elimination circuit is configured to consume or dissipate energy of the DC component extracted by the voltage converter circuit to eliminate the DC component from the power line. In one embodiment, the energy of the DC component may be dissipated as heat energy and/or electromagnetic wave. In one embodiment, the energy of the DC component may be transformed into usable power that is fed back into the power line.

Disclosed herein is also a method of eliminating a DC component on a power line carrying AC. The method includes extracting by a power converter the DC component of the power line from the power line to generate an extracted DC component. The method also includes consuming or dissipating by the power converter the energy of the extracted DC component to eliminate the DC component from the power line. In one embodiment, the method may include dissipating the energy of the extracted DC component as heat energy and/or electromagnetic wave. In one embodiment, the method may include transforming the energy of the extracted DC component into usable power such as AC voltage at the same frequency and phase as the AC of the power line and feeding back the generated AC voltage onto the power line. The terms "power converter," "voltage converter," and "converter" may be used interchangeably in the description that follows unless specifically noted otherwise.

BRIEF DESCRIPTION OF THE DRAWINGS

The accompanying drawings are provided together with the following description of various aspects and embodiments of the subject technology for a better comprehension of the invention. The drawings and the embodiments are illustrative of the invention, and are not intended to limit the scope of the invention. It is understood that a person of ordinary skill in the art may modify the drawings to generate drawings of other embodiments that would still fall within the scope of the invention.

FIG. 1 provides a simple taxonomy of detection methods for the DC injection problems with a particular focus on the new method in this application.

FIG. 2 shows the Fourier transformation decomposition model for the DC injection component.

FIG. 3 shows the superposition of the DC injection component on the coupling capacitor's voltage waveform.

FIG. 4 shows a simplified timing diagram of the generated pulsed square wave to compensate for the DC injection.

FIG. 5A depicts a circuit block diagram that computes the correction angle as a function of DC injection and then applies the correction angle computation to generate a pulsed square wave for the converter.

FIG. 5B provides the process flow of the two-stage mitigation control circuit depicted in FIG. 5A.

FIG. 6 shows the result of experiments on the line current before DC injection, during DC injection, and after mitigation control is applied.

FIG. 7A and FIG. 7B show the pulsed square wave of voltage and the line current before and after DC injection mitigation.

FIG. 8 provides a simple taxonomy of the mitigation methods and elimination methods for the DC injection problem in this application.

FIG. 9 is an example implementation of a dissipation method in the form of heat energy using resistor.

FIG. 10 is an example implementation of a dissipation method in the form of electromagnetic wave energy using RF amplifier.

FIG. 11 is an example implementation of a transformation method in the form of energy harvesting using a rectifier and a second converter.

DETAILED DESCRIPTION

Examples of various aspects and variations of the subject technology are described herein and illustrated in the accompanying drawings. Objects, features, and advantages of the invention will be apparent from the following detailed description taken in conjunction with the accompanying drawings. While various embodiments of the subject technology are described, the following description is not intended to limit the invention to these embodiments, but rather to enable a person skilled in the art to make and use this invention.

The presence of injected DC has harmful consequences for a power grid system. A piecewise sinusoidal ripple voltage wave at the line-frequency that rides on the main capacitor bank of the power converter is observed. This observation leads to a new detection method and mitigation method. A two-stage control circuit is added to the operation of a power converter that controls power line impedance in order to mitigate the injected DC and to block DC circulation. This control computes a correction angle to adjust the timing of generated pulsed square waves to counter-balance the ripple. A functional solution and the results of experiments are presented. Furthermore, an extraction method for this ripple component is presented to allow dissipation of DC energy through heat and/or electromagnetic wave, or to allow transformation of this energy into usable power that is fed back into the power grid.

Traditional methods to detect DC injection in the power grid, as shown in FIG. 1, include a design based on small-signal current saturable transformer 102, or a design based on comparing positive and negative voltages after being rectified and integrated 104, or a design based on closed-loop circuit with Hall Effect sensor 106. These are all well understood prior art examples in the field.

A piecewise sinusoidal ripple voltage at the line-frequency that rides on the main capacitor bank of the power converter can be observed when DC injection is present. This ripple component observation leads to a new control method. A control circuit is added to the existing power converter design to mitigate DC injection and block DC circulation. A correction angle is computed as a function of the DC injection magnitude 108. The computed correction angle is then used to adjust the timings of a generated pulsed square wave to counter-balance the ripple to mitigate DC injection 110. This ripple component can also be extracted and processed. Those methods will be discussed later in this section.

FIG. 2 shows a model based on Fourier transformation decomposition for this new observation. The voltages can be integrated separately and then summed together as shown. The DC component, when getting integrated into a voltage component, is manifested as a line-frequency piecewise sinusoidal wave 210. This voltage component is then superposed onto the capacitor voltage, shown as twice the line-frequency (2×f) wave 212. The resultant superposition is shown in 214. The implementation of the scheme could be done with a simple band-pass filter or low-pass filter.

FIG. 3 shows superposition in terms of waveforms, which complements the Fourier transformation decomposition model in FIG. 2. The capacitor voltage $V_{Cap}$ without the DC component superposed is shown by label 310. The DC component, after being integrated into voltage is shown by label 312. The superposed voltage is shown by label 314.

A pulsed square wave is typically the input to drive a full-wave quad-IGBT (insulated-gate bipolar transistor) DC-AC converter/inverter in the power electronics design. An example of this full-wave quad-IGBT DC-AC converter is shown on the right-hand side of FIG. 9. In FIG. 4, the required timings, $t_1$, $t_2$, $t_3$ and $t_4$, are shown for the pulsed square wave. The period T for the full cycle 404 and T/2 for the half-cycle 402 is noted in the FIG. 4. Normally, $t_1$ and $t_2$ are symmetric in the first positive-going half-cycle, and $t_3$ and $t_4$ are symmetric in the second negative-going half-cycle. Depending on the magnitude and direction of the DC injection, these timings are computed and the differences between $[t_2-t_1]$ and $[t_4-t_3]$ can control the positive-going and negative-going cycles for the converter and the power line to counter-balance the DC injection ripple.

Note that this detection and mitigation circuit can be running at all times, including the normal operations when there is no DC injection problem. If the ripple component is negligible, the correction angle will be zero and there will be no changes in the leading and trailing timings on the regular output of the pulsed square wave. This control can automatically engage, if configured as such, when DC injection is present and the correction angle will be recomputed continuously and the timings will be adjusted on every pulsed square wave cycle.

An example two-stage control circuit to mitigate this DC injection problem is presented in FIG. 5A. The first stage is shown in the upper block of FIG. 5A, where the line current $I_{DC}$ 501 is used directly to compute the correction angle theta θ.

This correction angle computation block compares the DC current in the line $I_{DC}$ 501 with a reference $I_{DC}$ Ref value 500 and then uses a proportional integrator (PI) controller 502 to compute the correction angle theta θ 503 for the pulsed square wave generator. This $I_{DC}$ Ref value 500 is set to zero in this implementation, but can be set differently for new applications. This correction angle is then fed to the second stage circuit in the lower block of FIG. 5A to generate the required timings for the pulsed square wave.

The second stage circuit, that is, the pulsed square wave generation block, works as follows. The voltage across the coupling capacitor $V_{DC}$ 506 is first compared with a reference $V_{DC}$ Ref voltage 505 and fed into a proportional integrator (PI) controller to be added later with a weighting factor α. A phase-locked loop (PLL) circuit 504 locks on the line current with the shift input (leading or lagging phase), that is, capacitive or inductive reactance selection, and is then added with the output of the previously-mentioned PI output to determine the frequency and amplitude of the pulsed square wave. The timing adjustment on the leading and trailing edges come from the correction angle theta θ.

This correction angle normally ranges from 0 to 90 degrees. With the boundary conditions, when the correction angle is zero degree, the pulsed square wave has no timing adjustments for the leading and trailing edges. That is, the pulsed square wave is not modified. When the correction angle is 90 degrees, the timing adjustments completely eliminate the corresponding half of the square wave.

FIG. 5B complements the mitigation control circuit diagram in FIG. 5A with a process flow diagram 550. Depending on the configuration setting 552 for "ride-through" feature, the process can either disable the so-called DC-Blocking capability 554, that is, the mitigation control circuit, or enable the DC-Blocking 556 with the two-stage control circuit in FIG. 5A. In one embodiment of the "ride-through" mode, the two-stage control circuit does not adjust the timing of the pulsed square waves, for example by forcing the correction angle theta θ to zero, when the converter drives the power line. The first stage of the two-stage control circuit is in the 558 branch while the second stage follows the branch 560 and branch 562 concurrently. The second stage branches 560 and 562 combines the weighted sum results of capacitor voltage deviation and line current deviation to feed to block 564 to generate pulsed square wave for the converter. The first stage branch 558 computes concurrently the correction angle theta θ to feed that to block 566 to generate pulsed square wave with appropriate timings.

A result of an experiment with this two-stage control circuit is presented in FIG. 6, which shows the line current before the DC injection event 610, after the DC injection event 612, and after the application of this mitigation control solution 614. This shows the effectiveness of the detection method and the mitigation method. The I_line_Mean (line current mean value) on the y-axis surges during a simulated DC injection event, and it is brought back down to normal value after the mitigation method is applied.

More experimentation results are presented in FIG. 7A and FIG. 7B. The y-axis has two sets of values, one is the pulsed square wave in voltage and the other is the line current in ampere. And FIG. 7A is before the mitigation control is applied and FIG. 7B is after the mitigation control is applied.

In FIG. 7A, the sinusoidal current is more positive than negative as a result of DC injection, asymmetrically and roughly between 1500 A and −1000 A. FIG. 7B shows that the current is symmetrical after the mitigation control circuit is applied. Note that in FIG. 7B the negative cycle of the generated voltage has a smaller duration, which corresponds to the value of $t_4-t_3$ shown in FIG. 4. In the example shown, the amplitudes of the positive and negative cycle are the same. The $t_1$ and $t_2$ are symmetrical within its positive half cycle and the $t_3$ and $t_4$ are symmetrical within its negative half cycle.

FIG. 8 shows the mitigation and elimination methods for the DC injection problem. The two mitigation methods on the left-hand side include the ride-through method 812 and DC-blocking method 814. It is important to allow the utilities to be able to select the default ride-through method 812, which would not engage mitigation control shown in FIG. 5A to deal with DC injection problems. This controllability allows the utilities to deploy the new functionalities to the field incrementally to protect the existing investment. The mitigation control in FIG. 5A, based on the observed ripple voltage, was presented earlier in this application and is referred to herein as "DC blocking".

On the right-hand side of FIG. 8 three dissipation/consumption methods 818 820 822 are shown that provide relief to the power grid for this DC injection problem. This DC injection component has to be extracted first 816. It can then be consumed in the form of heat dissipation 818 or electromagnetic wave irradiation 820. It also can be transformed and synchronized 822, phase-wise, with the power grid and re-inserted into the grid to become useful energy.

FIG. 9 shows an example of resistive dissipation design that can dissipate the energy as heat with proper cooling mechanism. On the right-hand side, it depicts the basic diagram of a full-wave inverter that converts DC to AC and vice versa. The $V_{AC}$ is the line voltage from the power grid. The operation is accomplished with alternating operations between IGBT (insulated-gate bipolar transistor) transistor pairs Q1-Q4 and Q2-Q3 in a fashion that the voltages on the DC capacitor is maintained and controlled in a predetermined range. The DC current bias on the AC, in this diagram, is positive, and consequently there is more current injected to the capacitor when commutating happens on the Q1 and Q4 pair. The excess on the voltage in the capacitor during the Q1-Q4 operation can be compensated during the Q2-Q3 operation. The voltage $V_C$ of the coupling capacitor is shown to have a ripple in 902. The extracted DC component after the band-pass filter is shown in 904 and is then used and converted to heat with a resistor bank.

FIG. 10 shows a RF (radio frequency) amplifier-based design can dissipate the energy by irradiation together with the use of transformer 1006 and antenna to operate in an environment that meets EM emission standards. Note that this is very similar to the design of FIG. 9 with the exception of how the extracted DC component is dissipated. The full-wave inverter on the right-hand side operates the same as that was explained above in FIG. 9. The voltage $V_C$ of the coupling capacitor is shown to have a ripple in 1002. The extracted DC component after the band-pass filter is shown in 1004 and is then used and converted to electromagnetic wave energy with a transformer and a RF amplifier.

FIG. 11 shows an inverter type design can transform the ripple energy into AC form that is synchronized with the AC power grid and can then be added to the AC power grid. Note that this is very similar to the design of FIG. 9 with the exception of how the extracted DC component is used. The full-wave inverter on the right-hand side operates the same as that was explained above in FIG. 9. The voltage $V_C$ of the coupling capacitor is shown to have a ripple in 1102. The extracted DC component after the band-pass filter is shown in 1104 and is then rectified, optionally, and converted again using a second converter. It is then fed back to the power grid synchronously.

The methods, devices, processing, and logic described above may be implemented in many different ways and in many different combinations of hardware and software. For example, electronic circuitry or a controller may be configured with hardware and/or firmware to perform the various functions described. All or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. The implementations may be distributed as circuitry among multiple system components, such as among multiple processors and memories, optionally including multiple distributed processing systems.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium.

The foregoing description, for purposes of explanation, uses specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. For example, while the detection, mitigation, and elimination of DC component have been illustrated using three-phase power transmission systems, the principles described are equally applicable to any alternating current transmission configuration. That includes two-phase, three-phase, four-phase or any polyphase configuration. In addition, while DC elimination methods are disclosed to allow dissipation of DC energy through heat and/or electromagnetic wave, or to allow transformation of this energy into usable power that is fed back into the power grid, the DC energy may be dissipated as other forms of energy, such as acoustic, motion energy, etc. The DC energy may also be converted into other forms of energy and stored for later use. The examples are thus illustrative and non-limiting. It is intended that the following claims and their equivalents define the scope of the invention.

What is claimed is:

1. An apparatus connected in series to a power line for eliminating an unwanted direct current (DC) component of the power line carrying an alternating current (AC), comprising:
    a voltage converter circuit configured to extract the DC component from the power line, wherein the voltage converter circuit includes a band-pass filter having an input connected to a DC capacitor that is connected across a full-wave DC-AC inverter/converter having four IGBT (insulated-gate bipolar transistor) Q1, Q2, Q3, and Q4, and wherein the transistor pairs Q1-Q4 and Q2-Q3 are configured to operate in an alternating fashion to maintain a voltage on the DC capacitor in a predetermined range; and
    a DC elimination circuit configured to consume energy of the DC component extracted by the voltage converter circuit to eliminate the DC component from the power line.

2. The apparatus of claim 1, wherein the voltage converter circuit is configured to extract the DC component on the power line as a piecewise sinusoidal ripple voltage at a line frequency of the AC of the power line.

3. The apparatus of claim 2, wherein the DC-AC inverter/converter is configured to drive the voltage of the power line to the DC capacitor, and wherein the voltage across the DC capacitor comprises the piecewise sinusoidal ripple voltage at the line frequency of the AC of the power line.

4. The apparatus of claim 3, wherein the band-pass filter is configured to filter the voltage across the DC capacitor to extract the DC component as the piecewise sinusoidal ripple voltage at the line frequency of the AC of the power line.

5. The apparatus of claim 1, wherein the DC elimination circuit is configured to dissipate the energy of the DC component extracted by the voltage converter circuit.

6. The apparatus of claim 5, wherein the DC elimination circuit comprises a resistor circuit configured to dissipate the energy of the DC component extracted by the voltage converter circuit as thermal energy.

7. The apparatus of claim 5, wherein the DC component extracted by the voltage converter circuit comprises a piecewise sinusoidal ripple voltage at a line frequency of the AC of the power line, and wherein the DC elimination circuit comprises an RF amplifier-based transmitter circuit configured to transform and radiate the extracted piecewise sinusoidal ripple voltage as electromagnetic wave energy.

8. The apparatus of claim 7, wherein the DC elimination circuit further comprises an antenna or a transformer configured to dissipate the electromagnetic wave energy.

9. The apparatus of claim 1, wherein the DC component extracted by the voltage converter circuit comprises a piecewise sinusoidal ripple voltage at a line frequency of the AC of the power line, and wherein the DC elimination circuit comprises a second voltage converter circuit configured to convert the piecewise sinusoidal ripple voltage into a converted AC voltage.

10. The apparatus of claim 9, wherein the apparatus is configured to synchronize in phase the converted AC voltage with the AC of the power line and to apply the phase-synchronized converted AC voltage onto the power line.

11. A method of eliminating an unwanted direct current (DC) component of a power line carrying an alternating current (AC), comprising:
    extracting, by a power converter, the DC component from the power line to generate an extracted DC component, the power converter including a band-pass filter having an input connected to a DC capacitor that is connected across a full-wave DC-AC inverter/converter having four IGBT (insulated-gate bipolar transistor) Q1, Q2, Q3, and Q4, and wherein the transistor pairs Q1-Q4 and Q2-Q3 are alternatively operated to maintain a voltage on the DC capacitor in a predetermined range; and
    consuming, by the power converter, energy of the extracted DC component to eliminate the DC component from the power line.

12. The method of claim 11, wherein the extracted DC component comprises a piecewise sinusoidal ripple voltage at a line frequency of the AC of the power line.

13. The method of claim 12, wherein extracting, by the power converter, the DC component from the power line to generate the extracted DC component comprises driving the voltage of the power line to the DC capacitor and filtering, by the band-pass filter, the extracted DC component to obtain the piecewise sinusoidal ripple voltage at the line frequency of the AC of the power line.

14. The method of claim 11, wherein extracting, by the power converter, the DC component from the power line to generate the extracted DC component comprising storing, by the power converter, the energy of the extracted DC component.

15. The method of claim 11, wherein consuming, by the power converter, energy of the extracted DC component to eliminate the DC component from the power line comprises dissipating, by the power converter, the energy of the extracted DC component.

16. The method of claim 15, wherein dissipating, by the power converter, the energy of the extracted DC component comprises dissipating, by the power converter, the energy of the extracted DC component as thermal energy.

17. The method of claim 15, wherein dissipating, by the power converter, the energy of the extracted DC component comprises dissipating, by the power converter, the energy of the extracted DC component as electromagnetic energy.

18. The method of claim 17, wherein the extracted DC component comprises a piecewise sinusoidal ripple voltage at a line frequency of the AC of the power line, and wherein dissipating, by the power converter, the energy of the extracted DC component as electromagnetic energy comprises radiating, by the power converter, the piecewise sinusoidal ripple voltage as electromagnetic waves.

19. The method of claim 11, wherein the extracted DC component comprises a piecewise sinusoidal ripple voltage at a line frequency of the AC of the power line, and wherein consuming, by the power converter, energy of the extracted DC component to eliminate the DC component from the power line comprises converting, by a second power converter, the piecewise sinusoidal ripple voltage into a converted AC voltage.

20. The method of claim 19, wherein consuming, by the power converter, energy of the extracted DC component to eliminate the DC component from the power line further comprises:

synchronizing in phase, by the second power converter, the converted AC voltage with the AC of the power line to generate a phase-synchronized converted AC voltage; and applying, by the second power converter, the phase-synchronized converted AC voltage onto the power line.

* * * * *